Nov. 18, 1941.   R. S. FOX   2,263,490

PROCESS OF MANUFACTURING CRULLERS, DOUGHNUTS, AND THE LIKE

Filed Oct. 29, 1940

Inventor:—
Roy S. Fox
by his Attorneys
Howson & Howson

Patented Nov. 18, 1941

2,263,490

UNITED STATES PATENT OFFICE 2,263,490

PROCESS OF MANUFACTURING CRULLERS, DOUGHNUTS, AND THE LIKE

Roy S. Fox, York, Pa., assignor to Edw. Fox Baking Co., Inc., York, Pa., a corporation of Pennsylvania Application October 29, 1940, Serial No. 363,341

2 Claims. (Cl. 107—54)

A principal object of this invention is to provide an improved and more economical process for manufacturing confections, such as crullers or doughnuts, which are conventionally produced in annular form. Such articles are normally died or otherwise cut from flat sheets of dough in the annular form, with the result that the portions of the dough sheet which constitute the severed centers of the annuli, and the other portions between the outer edges of the annuli, must be recombined and reprocessed for further use if excessive waste is to be avoided. Inevitably there is a certain amount of waste attending this conventional method of manufacture.

I have discovered a process whereby such articles way be produced in more or less conventional form, with complete avoidance of the waste mentioned above, and with an avoidance also of necessity for reprocessing any portion of the dough mass for reuse.

The process is illustrated in the attached drawing, wherein.

Figure 1:
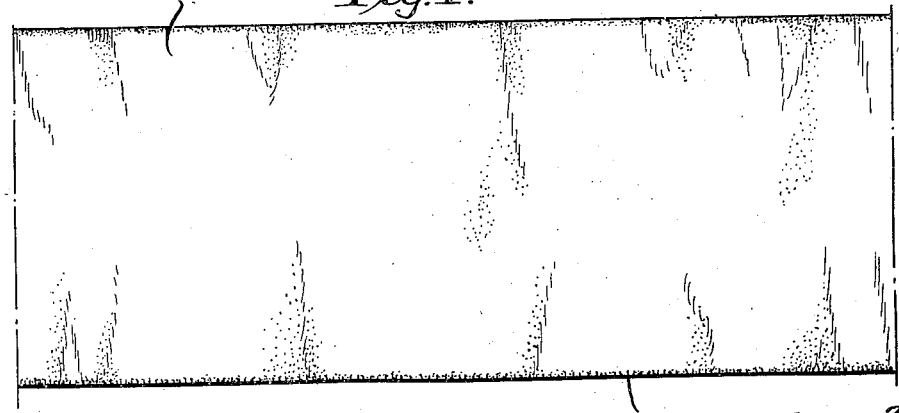
Figure 1 is a section of a strip or sheet of dough of a thickness suitable for the production of the finished articles.
Figure 2:
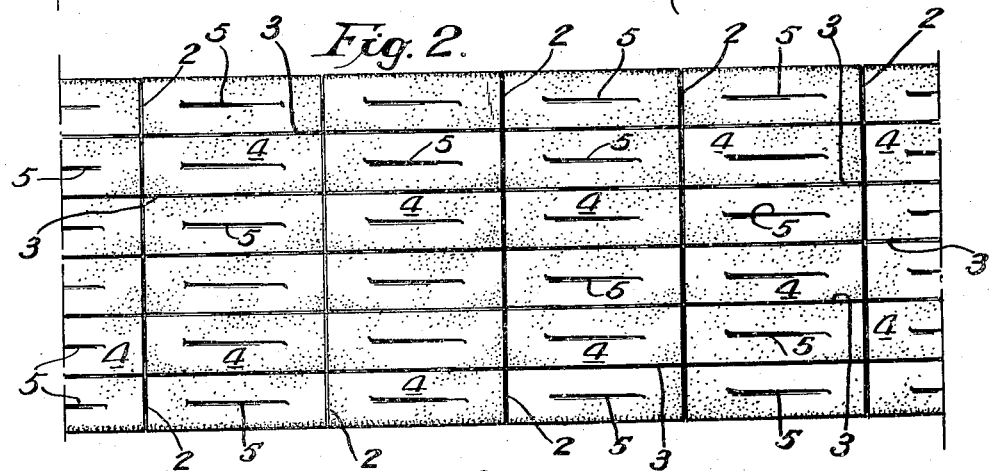
Fig. 2 illustrates a preferred method of dividing the sheet into sections for production of the individual articles.
Figure 3:
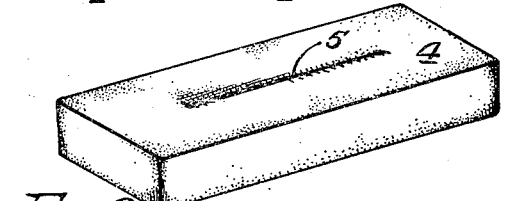
Fig. 3 is a view in perspective of one of the sections thus produced.

With reference to the drawing, the sheet 1 of dough shown in Fig. 1 constitutes, in effect, a blank from which is cut individual small sections of a size suitable for the individual finished product. This blank may be of any desired dimensions suitable, for example, for insertion in or passage through a cutting machine. In accordance with my method, the blank 1 is severed on transverse lines 2 and longitudinal lines 3 so as to divide the blank into a plurality of individual sections 4, one such section being shown in Figure 2. Each of the sections 4 is slit, as indicated at 5, said slit lying entirely within the peripheral bounds of the section. The incision 5 may be in the form of a simple straight line slit extending longitudinally of the section 4 as illustrated, or may be of more complicated form without departing from the essential features of the invention. The severing and slitting of the blank may constitute a single operation, as in a machine, or may be accomplished in successive steps. The foregoing operation or operations contemplate the division of the entire body of the blank 1 into separate small sections of a size and form suitable for production of the individual final product and is accomplished without waste. In the present instance, the individual sections 4 are rectangular in shape, but it is apparent that the said sections may take various polygonal shapes other than rectangular such that jointly they embrace the entire dimensional area of the blank 1.

Figure 4:
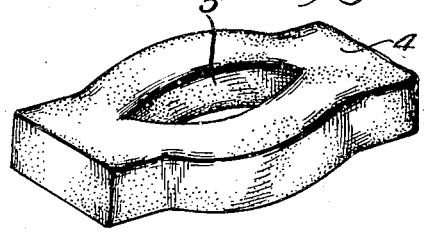
Fig. 4 is a view in perspective of the section as expanded to establish the general form of the finished article.
Figure 5:
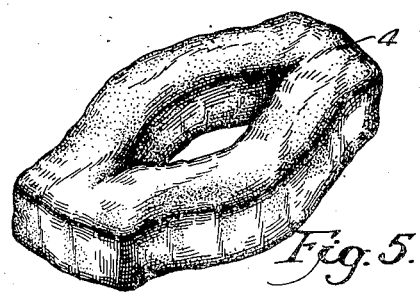
Fig. 5 is a view in perspective of the final product.

Subsequent to the separation of the blank into the individual sections, each of the sections is expanded by drawing apart the portions thereof at opposite sides of the slit 5 so that the section is made to assume a form, for example, as shown in Fig. 4, thus conforming in a general way with the conventional annular form of this type of goods. The dough being to a degree moldable, it is apparent that the individual sections may be made to assume various forms both as to the exterior and interior contours, and the final form of the section will depend to some extent upon the original shape. The individual open centered sections may now be fried or baked in accordance with the usual procedure to produce the final product, which may, for example, take the form shown in Fig. 5.

It will be noted that the process as described above is highly susceptible to practice by machine operation, and that it is characterized by a substantially complete absence of waste and the necessity of reprocessing any portion of the original dough body for further use. It will be noted further that the end product is essentially of the same character as the product produced by the conventional means, and that the process is capable also of producing the end product in various attractive forms departing from the conventional annular.

I claim:

1. The method of producing articles of the character described, which consists in first forming a blank sheet of dough, dividing said sheet into a plurality of sections which jointly embrace substantially the entire area of the sheet, each of said sections being slit through within the bounds of the peripheral edges thereof, expanding the individual sections by drawing apart the portions thereof at opposite sides of the slit, and cooking the individual sections to form the finished product.

2. The method of producing articles of the character described, which consists in first forming a blank sheet of dough, severing the sheet on a system of intersecting straight lines dividing substantially the entire area of the blank into a plurality of small polygonal sections, each of said sections being slit through within the bounds of the peripheral edges thereof, expanding the individual sections by drawing apart the portions thereof at opposite sides of the slit, and cooking the individual sections to form the finished product.

ROY S. FOX.